United States Patent
Bebawy et al.

(10) Patent No.: US 9,439,141 B2
(45) Date of Patent: Sep. 6, 2016

(54) DECODING ALGORITHM FOR THE HS-DPCCH HARQ MESSAGE EXPLOITING THE PRE-AND POSTAMBLES

(71) Applicant: TELEFONAKTIEBOLAGET L M ERICSSON (PUBL), Stockholm (SE)

(72) Inventors: Michael Samuel Bebawy, San Jose, CA (US); Yi-Pin Eric Wang, Fremont, CA (US); Erik Larsson, Stockholm (SE); Peter von Wrycza, Stockholm (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 647 days.

(21) Appl. No.: 13/859,570

(22) Filed: Apr. 9, 2013

(65) Prior Publication Data
US 2014/0301257 A1    Oct. 9, 2014

(51) Int. Cl.
| | |
|---|---|
| *H04W 52/02* | (2009.01) |
| *H04L 1/16* | (2006.01) |
| *H04L 1/00* | (2006.01) |
| *H04L 1/12* | (2006.01) |

(52) U.S. Cl.
CPC ........ *H04W 52/0212* (2013.01); *H04L 1/0026* (2013.01); *H04L 1/0073* (2013.01); *H04L 1/1628* (2013.01); *H04L 1/1671* (2013.01); *H04L 2001/125* (2013.01)

(58) Field of Classification Search
CPC . H04L 1/0073; H04L 1/1812; H04L 1/1671; H04L 2001/125; H04L 1/0026
See application file for complete search history.

(56) References Cited

U.S. PATENT DOCUMENTS

| | | | |
|---|---|---|---|
| 2006/0098679 A1* | 5/2006 | Cheng ................. | H04J 13/00 370/441 |
| 2010/0074120 A1 | 3/2010 | Bergman et al. | |
| 2012/0176947 A1* | 7/2012 | Xi ..................... | H04L 1/0026 370/311 |

(Continued)

FOREIGN PATENT DOCUMENTS

| | | |
|---|---|---|
| EP | 1816754 | 8/2007 |
| WO | WO-2004028050 | 4/2004 |
| WO | WO-2008041932 | 4/2008 |

OTHER PUBLICATIONS

"Universal Mobile Telecommunications System (UMTS); Multiplexing and channel coding (FDD)", 3GPP TS 25.212 version 11.3.0 Release 11; Sep. 2012; 138 pages.

(Continued)

*Primary Examiner* — Jung Park
(74) *Attorney, Agent, or Firm* — Nicholson, De Vos, Webster & Elliot, LLP

(57) ABSTRACT

A method that is implemented by a base station to decode a high speed dedicated physical control channel (HS-DPCCH) using a preamble and postamble of a hybrid automatic repeat request (HARQ) message while maintaining a fixed false alarm probability of interpreting a discontinuous transmission (DTX) as a HARQ acknowledgement (ACK) or HARQ negative acknowledgement (NACK). The method includes a set of steps, including receiving a signal from a user equipment (UE). The signal is despread using a G-RAKE demodulator. The despread signal is combined to produce a combined symbol estimate vector x including a preamble and postamble of the HARQ message. The combined symbol estimate vector x is checked to determine whether the signal includes a DTX, HARQ ACK or HARQ NACK, and then the DTX, HARQ ACK or HARQ NACK is output.

14 Claims, 7 Drawing Sheets

(56) References Cited

U.S. PATENT DOCUMENTS

2013/0308612 A1* 11/2013 Cai ................... H04L 1/0028
  370/336
2015/0131509 A1* 5/2015 Fan ................ H04W 52/0216
  370/311

OTHER PUBLICATIONS

"Universal Mobile Telecommunications System (UMTS); Physical Channels and Mapping of transport channels onto physical channels (FDD)", 3GPP TS 25.211; 44 pages; Sep. 2000.

* cited by examiner

DECODING ALGORITHM FOR THE HS-DPCCH HARQ MESSAGE EXPLOITING THE PRE-AND POSTAMBLES

FIELD

Embodiments of the invention relate to the field of high speed dedicated physical control channel (HS-DPCCH) processing; and more specifically, to the decoding of HS-DPCCH Hybrid ARQ (HARQ) messages in a high speed packet access (HSPA) uplink.

BACKGROUND

In a cellular communication system, also referred to as a wireless communication system, user equipment, also known as mobile terminals and/or wireless terminals communicate via a Radio Access Network (RAN) to one or more core networks. The user equipment are mobile telephones also known as "cellular" telephones, and laptops with wireless capability, or similar portable, pocket, hand-held, computer-included, or car-mounted mobile devices which communicate voice and/or data via a radio frequency transmission.

The radio access network covers a geographical area which is divided into cell areas, with each cell area being served by a base station, e.g., a Radio Base Station (RBS), which in some networks is referred to as "eNB," "NodeB," "eNodeB," "Base Station Subsystem," "BSS" or "B node" and which in this document is referred to as a base station. A cell is a geographical area where radio coverage is provided by the base station equipment at a base station site. The base station communicates using an over-the-air interface that operates on radio frequencies with the user equipment within range of the base station.

In some versions of the radio access network, several base stations are typically connected, e.g. by landlines, optical fiber or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The user equipment and the base station can form a Universal Mobile Telecommunications System (UMTS), which is a third generation mobile communication system, and can provide improved mobile communication services based on Wideband Code Division Multiple Access (WCDMA)—high speed packet access (HSPA) technology. At the physical layer, HS-DPCCH is one of the uplink control channels on which the UE transmits to the base station. It consists of two parts. The channel quality indicator (CQI) and the hybrid automatic repeat request (HARQ) signal. A HARQ message, which is an acknowledgement (ACK) or a negative acknowledgement (NACK) or a combination of more than one of them, is transmitted when the UE has something to report about the recently received high speed downlink shared channel (HS-DSCH) data subframes from the base station. If the UE does not receive any frames from the base station, it will not transmit anything. In other words, it will transmit a zero-power message which is referred to as 'Discontinuous Transmission' (DTX). The codebook of the HARQ message depends on whether the UE is scheduled in multiple input multiple output (MIMO) mode or not, the number of simultaneous carriers, and similar criteria.

SUMMARY

A method is implemented by a base station to decode a high speed dedicated physical control channel (HS-DPCCH) using a preamble and postamble of a hybrid automatic repeat request (HARQ) message while maintaining a fixed false alarm probability of interpreting a discontinuous transmission (DTX) as a HARQ acknowledgement (ACK) or HARQ negative acknowledgement (NACK). The method includes a set of steps, including receiving a signal from a user equipment (UE). The signal is despread using a G-RAKE demodulator. The despread signal is combined to produce a combined symbol estimate vector x including a preamble and postamble of the HARQ message. The combined symbol estimate vector x is checked to determine whether the signal includes a DTX, HARQ ACK or HARQ NACK, and then the DTX, HARQ ACK or HARQ NACK is output.

A base station is configured to decode a high speed dedicated physical control channel (HS-DPCCH) using a preamble and postamble of a hybrid automatic repeat request (HARQ) message while maintaining a fixed false alarm probability of interpreting a discontinuous transmission (DTX) as a HARQ acknowledgement (ACK) or HARQ negative acknowledgement (NACK). The base station is configured to include a transceiver to receive a signal from a user equipment (UE). The base station also includes a G-RAKE demodulator coupled to the transceiver, the G-RAKE is configured to despread the signal and to combine the despread signal to produce a combined symbol estimate vector x including a preamble and postamble of the HARQ message. A decoder in the base station is coupled to the G-RAKE demodulator, the decoder is configured to receive the combined symbol estimate vector x from the G-RAKE demodulator, to check the combined symbol estimate vector x to determine whether the signal includes a DTX, HARQ ACK or HARQ NACK, and to output the DTX, HARQ ACK or HARQ NACK.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DESCRIPTION OF EMBODIMENTS

Figure 1:
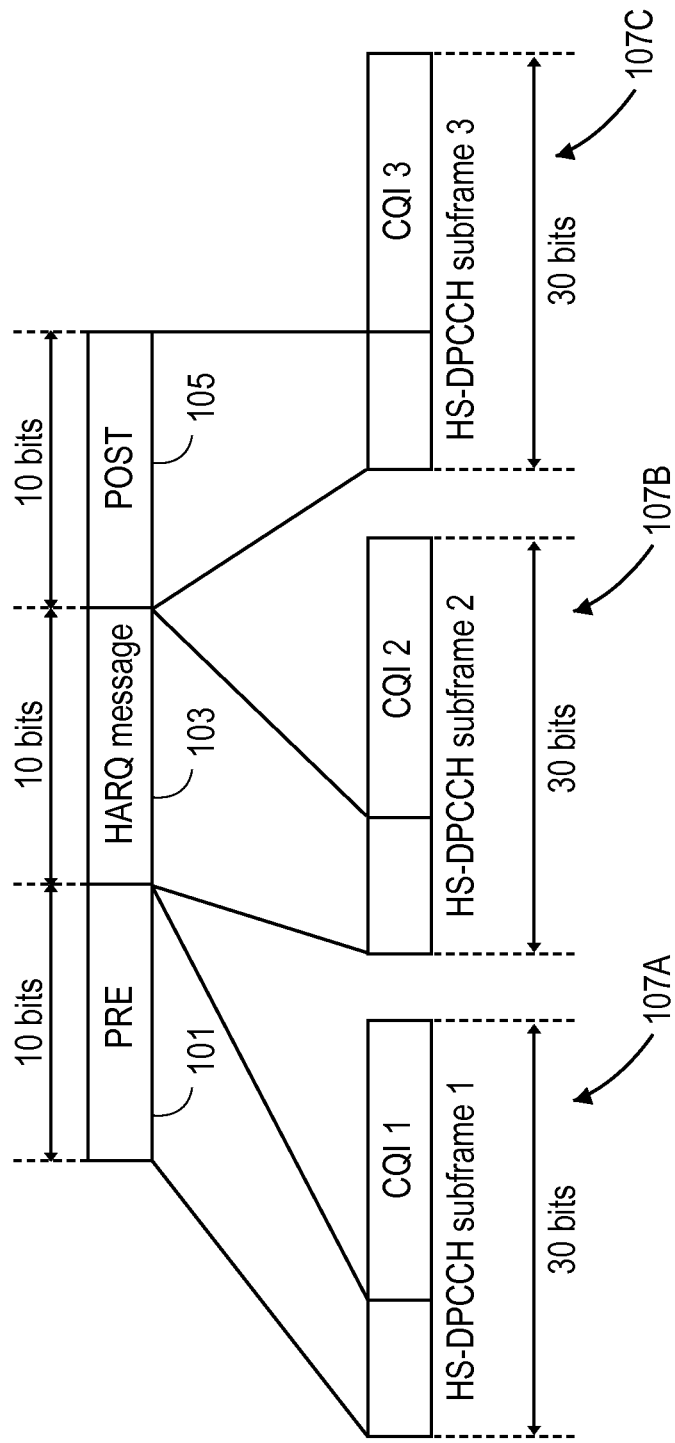
FIG. 1 is a diagram of HS-DPCCH frame segmentation.

In the following description, numerous specific details are set forth. However, it is understood that embodiments of the invention may be practiced without these specific details. In other instances, well-known circuits, structures and techniques have not been shown in detail in order not to obscure the understanding of this description. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flowcharts will be described with reference to the exemplary embodiment illustrated in the diagrams. However, it should be understood that the operations of flowcharts can be performed by embodiments of the invention other than those discussed with reference to diagrams, and the embodiments discussed with reference to diagrams can perform operations different than those discussed with reference to the flowcharts.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange routes and select those routes based on one or more routing metrics.

The embodiments of the invention described herein below provide a method and system for implementing a detection algorithm for the HARQ message of the HS-DPCCH channel that can make use of the preamble and postamble of the HARQ in the subframes of the HS-DPCCH signal. It also maintains a fixed false alarm probability as per the requirement of the base station. Three challenges face the reception of the HARQ message: i) a false alarm, which is an event where a DTX was transmitted by the UE, but the base station mistakenly interprets it as one or more ACKs, ii) a miss event which is the case where a HARQ message is interpreted as a DTX or iii) an error event, which is the case of one HARQ message being misinterpreted by the base station as a different one. To increase the base station's robustness against the first two events, the WCDMA standard dictates the transmission of a preamble (PRE) and a postamble (POST) before and after the HARQ message(s) respectively. PRE and POST are transmitted only if the UE has a HARQ message to report but not before and after a DTX.

The codebook of the HARQ message depends on whether the UE is scheduled in MIMO mode or not, the number of simultaneous carriers, and similar factors. Another important requirement of the base station is for the HS-DPCCH decoder to maintain a fixed false alarm (FA) probability disregarding the receive signal to interference and noise ratio (SINR). This is done by designing the decision threshold between the DTX and other message points in the constellation to be a function of the measured SINR value.

The embodiments include a process implemented in a base station for detection of the HARQ message of the HS-DPCCH channel that can make use of the PRE and POST signals. The embodiments, maintain a fixed FA probability as per the requirement of the base station. This detection process improves the reliability of the HARQ message reception by exploiting the PRE and POST part of the HARQ message since the energy transmitted on them can be exploited to lower the probability that a HARQ message may be interpreted as a DTX (a miss event) or that a DTX be interpreted as a HARQ message (a false alarm). The check that is done has very low complexity and requires a few additions. This is because when evaluating the inequalities (1), the entries of the vectors $a_i$ are ±1, as explained further herein below.

UMTS and HS-DPCCH Communication

In UMTS the data generated at higher layers is carried over the air with transport channels, which are mapped in the physical layer to different physical channels. Before the transport channels are mapped to the physical channels CRC (Cyclic Redundancy Check) attachment, channel coding, interleaving and other operations are performed on the transport channel data at the UE. After the transport channels are mapped to the physical channels the data on the physical channels is modulated. The modulation can be binary phase shift keyed (BPSK), quadrature phase shift keyed (QPSK) modulation as well as 16 quadrature amplitude (QAM) modulation. UMTS is a wideband code division multiple access (WCDMA) system, where user information symbols are spread over a wide bandwidth by multiplying the user symbols with quasi-random sequences of "chips" that have a shorter time duration, hence a larger bandwidth (which is the reason WCDMA systems are often described as "spread-spectrum" systems). The number of chips per symbol is called the spreading factor (SF). The signal is scrambled by multiplication with a scrambling code. Finally the scrambled signal is pulse-shape filtered and converted from digital to analog to be modulated on the carrier waveform in the analog domain.

The signal transmitted from the UE propagates in a multipath radio channel with each path having its own delay and attenuation. As a result, the resultant signal received at the base station is the sum of several versions of the transmit signal each with a different delay and strength. At the base station, the received signal is filtered, amplified and carrier waveform demodulated in the analog domain, then converted to the digital domain. The digital signal is processed by a RAKE or G-RAKE receiver, which is composed of multiple correlation receivers referred to as the RAKE fingers, with each finger assigned to a certain delay in order to capture as much as possible of the signal energy that got scattered over the channel's multipaths. Each RAKE finger chain descrambles and despreads the received signal. The outputs of all the fingers are linearly combined to yield "soft symbols" (metrics) that are used by the channel decoder to identify the data bits of the transmission including HS-DPCCH frames of the HS-DPCCH uplink control channel.

The HS-DPCCH uplink control channel carries two messages from the UE to the base station. The first one is the HARQ message to inform the base station about the success or failure of interpreting one or more recently transmitted high speed-high speed-downlink shared channel (HS-DSCH) data subframes (i.e., subframes previously transmitted from the base station to the UE). The HS-DSCH is a downlink transport channel carrying data from the base station to the UE. The second part is the channel quality indicator (CQI) that reports to the base station the quality of the downlink channel. This information is used by the base station for certain purposes like estimating the appropriate downlink modulation and code rate. When the UE senses a new frame (or several frames if multiple carriers or MIMO are in effect), it prepares a HARQ message to acknowledge (ACK) the frames that are successfully received—this is known through a cyclic redundancy check (CRC)—or to negatively acknowledge (NACK) those that are not successfully received. A HARQ message consisting a single ACK or NACK or a combination of more than one of them is withdrawn from a codebook—a fixed list known to both the UE and the base station of what bit sequence is to be transmitted in case one or more ACK or NACK messages is to be signaled to the base station. The codebook itself is chosen depending on the whether the UE is scheduled to transmit in MIMO mode or not and on the number of carriers. For example, in the simple case of a single HARQ message, the UE uses a repetition code of rate 1/10. That is, if it wants to ACKnowledge the successful reception of a data subframe, it sends a sequence of 10 ones. Otherwise, the case of failure (NACK) corresponds to sending 10 zeros. The UE prepares the HARQ frame to be transmitted by prepending and postpending the PRE and POST signals to the HARQ message (as shown in FIG. 1). This HARQ message is then demultiplexed over three or more consecutive HS-DPCCH subframes and transmitted to the base station.

The WCDMA standard took some precautions to assure the robustness of the HS-DPCCH transmission against channel errors. These include a large spreading factor (SF) of 256 chips, BPSK modulation and a low code rate (for example, 0.1 in the case of single carrier SISO). As mentioned above the G-RAKE demodulator at the base station first despreads the received signal, then it combines the despread signal to produce a combined symbol estimate vector x used in the decoding. The combined symbol estimate vector x may contain the PRE and POST or may exclude this (informationless) portion of the HARQ message. The process described herein assumes that the PRE and/or the POST are including in the combined symbol estimate vector x, however, one skilled in the art would understand that the principles, structures and processes described herein can also be applied to a combined symbol estimate vector x that does not include the PRE and/or the POST.

The combined symbol estimate vector x is then processed by a decoder to identify the content (e.g., HARQ and/or CQI messages). The decoder normally does not use the PRE and POST part of the combined signal estimate vector x. Rather, the decoder strips the PRE and POST or the G-RAKE excludes them, such that the decoder makes a decision about whether a HS-DPCCH frame including a HARQ message has been received. While removing the PRE and POST simplifies the analysis of the codeword constellations (a plotting of the received signal carrier components), the accuracy of the identification is lower in comparison with the process described herein below when it includes the PRE and POST.

FIG. 1 is a diagram of HS-DPCCH segmentation. As mentioned earlier, a HS-DPCCH signal consists of two portions: the CQI and the HARQ messages. One HARQ message is spread over at least three HS-DPCCH subframes. The illustration shows the case where the HARQ message carries a single ACK or NACK in the HARQ message section 103. The HARQ message includes PRE 101 and POST 105. Spread across the subframes 107A-C, the PRE 101, HARQ message 103 and POST 105 are in separate subframes. In prior systems, the decoder would consider only the codeword constellation of the HARQ message 103 in the subframe 107B to determine whether a HARQ message has been received and the type of the HARQ message. The process described herein below utilizes the PRE 101 and/or POST 105 in subframes 107A, 107C, respectively, in addition to the HARQ message portion 103.

The embodiments described herein apply the decoder process to a HARQ message including a single ACK or NACK (e.g., in the HARQ message portion 103). However, the HARQ message is capable of carrying multiple ACK and NACK components (i.e, to ACK or NACK separate transmissions of the base station). For instance, a HARQ message from the UE to the base station could be [Pre, ACK, NACK, ACK, POST] which in this case spans 5 subframes. The analysis with regard to identifying decision boundaries is modified in such cases to identify each of the HARQ message components.

When a HARQ message is not transmitted, for example where the UE has nothing to report or completely misses a transmission from the base station, then the HS-DPCCH frame does not include the PRE, POST or HARQ message components. These sections of the HS-DPCCH subframes are empty (i.e., contain all zeros or similarly padded content). The CQI portions still contain CQI information and are populated independent of the HARQ message portions of the HS-DPCCH subframes. The empty HARQ in a HS-DPCCH subframe is referred to as a discontinuous transmission (DTX). The decoder must distinguish between the DTX and HARQ messages as well as distinguish between HARQ ACK and NACKs.

Figure 2:
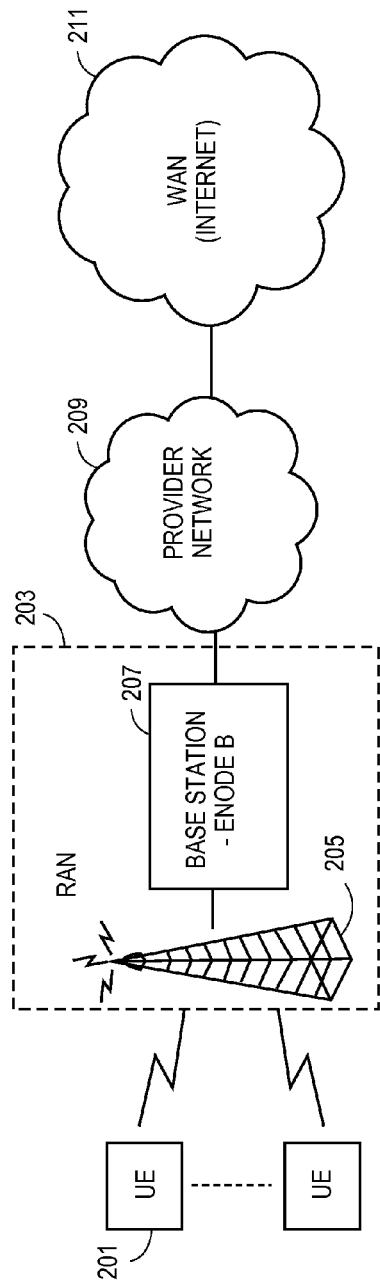
FIG. 2 is a diagram of an example communication system including user equipment and base station according to one embodiment of the invention.

FIG. 2 is a diagram of an example communication system including user equipment and base station according to one embodiment of the invention. In one embodiment, the process is executed by a base station 207 (also referred to as an eNodeB) in a radio access network 203. The base station 207 communicates with user equipment (UE) 201 through an attached antenna array 203 or similar mechanism over RF carrier frequencies using spread spectrum MIMO communication protocols. The base station 207 can communicate with any number of UE devices 201. The RAN 203 can provide an interconnected network of base stations 207 and antenna arrays 203 to provide connectivity of data and voice communications over a wide geographical area. A single base station 207 can be positioned with each antenna array 205 or multiple base stations 207 can be positioned at or near an antenna array 205.

The UE devices 201 can be cellular telephones, portable computing devices with cellular communications capabilities and similar devices. The UE devices 201 can communicate voice or data to the base station for forwarding over the provider network 209 and/or wide area network 211 such as the Internet to reach a destination device such as another cellular telephone, a server or similar computing device. The base station 207 and RAN 203 can be connected to or form a part of a provider network 209. The provider network 209 is a communication network administered by an Internet Service Provider, cellular communication service company or similar entity to enable voice and/or data communication between attached devices and devices accessible over other provider networks and the Internet 211.

Figure 3:
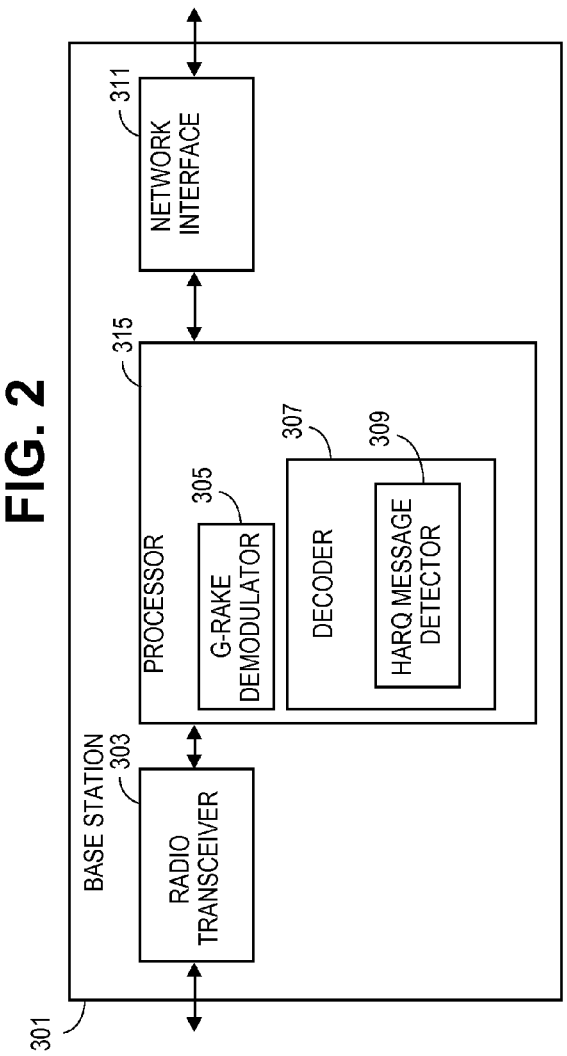
FIG. 3 is a diagram of one embodiment of a base station implementing the HARQ detection process.

FIG. 3 is a diagram of one embodiment of a base station implementing the decoder and HARQ message detection process. The base station 301 can be any type of computing or networking device including a specialized device or general purpose computing device configured for base station functionality. The base station 301 can include a processor 315 or set of processors to process data traffic received over the interfaces of the base station 301. The processor 315 can be specialized network processor (e.g., an application specific integrated circuit (ASIC)) or general purpose processing unit configured to execute base station functions. The processor 315 can include memory, caches and similar resources that are integrated or separate components within the base station 301. The base station 301 can also include other components such as persistent storage devices and other components.

The processor 315 receives data traffic from the UE connected through the radio transceiver 303 and connected antenna array. Similarly, the base station transmits data traffic to the UE through this radio transceiver interface. In other embodiments, this RF communication functionality and other functions of the base station 301 can be executed by other components that work in coordination with the base station 301 to perform the operations described herein.

The processor 315 receives data via a network interface 311 destined for the UE and transmits data from the UE to the provider network or the Internet via the network interface 311. The base station 301 can include any number and type of network interfaces 311. The network interfaces 311 can include multiple connections to the provider network or to separate provider networks or the Internet. The network interface 311 can connect the base station with these networks using any communication medium including wired or wireless communication mediums such as fiber optic cables and similar communication media.

The processor 315 can execute or implement in hardware a G-RAKE demodulator 305 and a decoder 307 amongst other components and functions involved in the support of UMTS and WCDMA communication. For sake of clarity, these other components are not illustrated or described in detail in order not to obscure the function of the embodiments implementing the HARQ detection process. The G-RAKE demodulator 305 as described herein above, processes the components of the received signal including performing descrambling, despreading and symbol combining functions to help subsequent channel decoders identify the transmitted information including the two HS-DPCCH portions (CQI and HARQ described herein above). The result produced by the G-RAKE demodulator 305 in case of the HARQ portion of the HS-DPCCH is a combined symbol estimate vector x, which can contain or exclude the (informationless) PRE and POST segments.

The decoder 307 receives the combined symbol estimate vector x from the G-RAKE demodulator 305. The decoder 307 identifies the contents of the received HS-DPCCH frames including whether a HARQ message is included (or whether a DTX has been received), the content of the HARQ message (ACK or NACK), CQI data and similar information from the received HS-DPCCH subframes. The identification of the HARQ message information can be implemented as a HARQ message detector 309. The HARQ message detector operates as described herein below. Generally, the HARQ message detector utilizes the PRE and POST in addition to the HARQ message portion in the HS-DPCCH subframes that contain ACKs or NACKs. The detection of DTX, ACK or NACK can be performed in any order or grouping. For example, in one embodiment, a determination whether a DTX was received is determined and then in a second round the data is determined to be either an ACK or NACK. In other embodiments, a test of whether the message contains an ACK is first made before a DTX or NACK is determined. The first embodiment may be favored because of the symmetry that the decoder creates between the constellation symbols in case the DTX point is excluded first. On the other hand, the second embodiment may be preferred in some cases where the ACK message is known to be transmitted much more often than a NACK or a DTX, in which case, the HARQ decoding would terminate faster if the ACK test is performed first.

Figure 4:
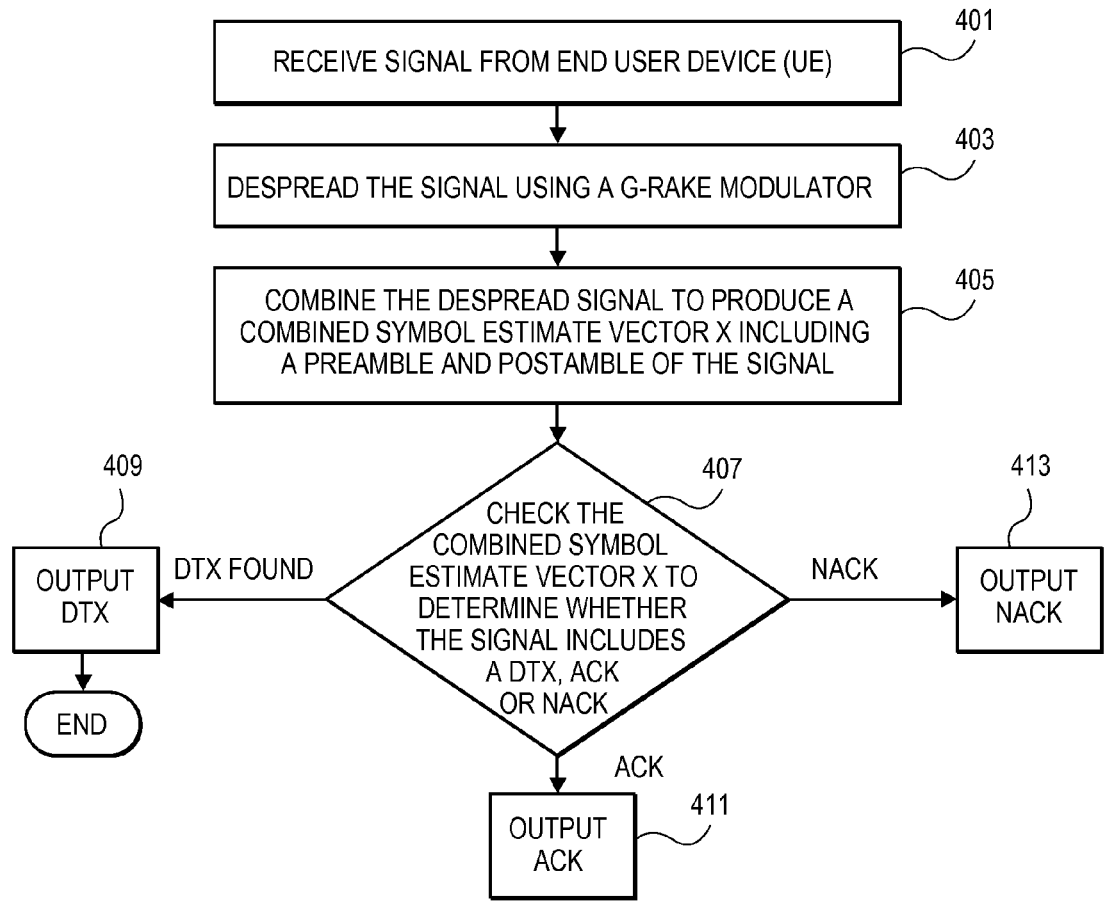
FIG. 4 is a flowchart of one embodiment of a HARQ message detection process.

FIG. 4 is a flowchart of one embodiment of a HARQ message detection process. The process in FIG. 4 is a general overview, with implementation specific details discussed in relation to FIGS. 5 and 7. The process is initiated in response to receiving a signal from the UE (Block 401). The received signal is a WCDMA transmission including a set of carrier components that encode data and control information from the UE. Analog to digital conversion can be carried out before the data is provided to the G-RAKE demodulator for further processing at the base station. The G-RAKE demodulator can despread the received data (Block 403). The G-RAKE demodulator then combines the despread signal to produce a combined symbol estimate vector x that can include the preamble (PRE) and postamble (POST) of a HARQ message (Block 405). The combined symbol estimate vector x can correspond to the symbol estimates derived from the dispreading process that align with a set of HS-DPCCH subframes related to the HARQ message.

The combined symbol estimate vector is then tested to determine whether the signal had included a DTX, a HARQ ACK or HARQ NACK (Block 407). The check utilizes both the HARQ message portion (i.e., HARQ word) containing the relevant HARQ ACK, HARQ NACK or DTX and also the HARQ words containing the PRE and POST. The determination of the content of the HS-DPCCH subframes can be carried out in a single operation or broken down into multiple operations such as determining first whether the signal contained a DTX and if not, detecting a type of HARQ word if present. Utilizing the PRE and POST data improves the accuracy of the detection without adding significant overhead. An example implementation of the process is described herein below in regard to FIG. 5.

Determination of the content of the signal (i.e, did it contain a HARQ message or DTX) is the ultimate result of the process to be output for the use of high levels of the base stations communication processes. A DTX detection will output a DTX (Block 409), a HARQ word detection will output a HARQ ACK (Block 411) or a HARQ NACK (Block 413).

Figure 5:
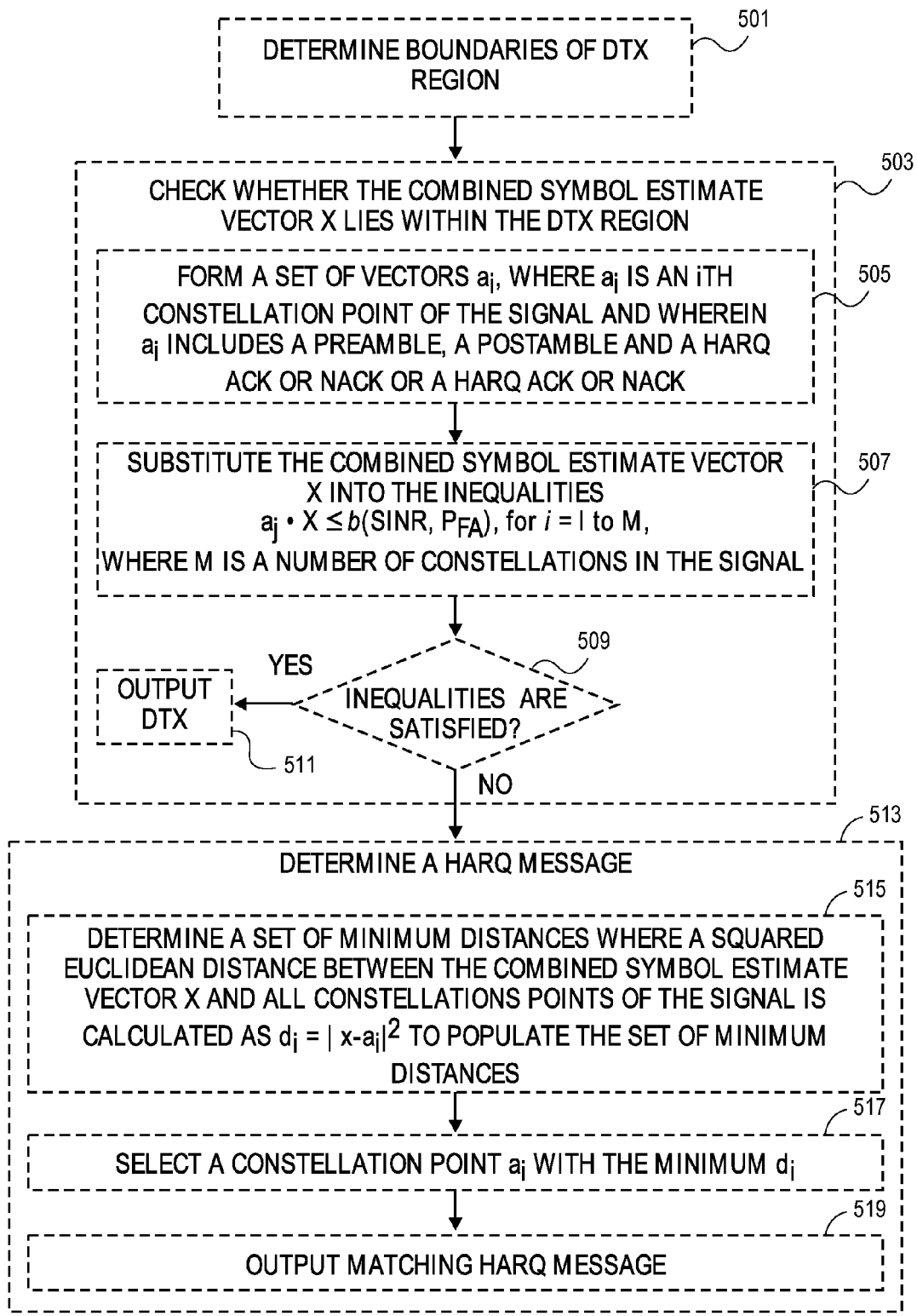
FIG. 5 is a flowchart of one embodiment of a process for differentiating a HARQ message from a DTX and determining a type of HARQ message.

FIG. 5 is a flowchart of one embodiment of a process for differentiating a HARQ message from a DTX and determining a type of HARQ message. In one embodiment, the process is started with the detection of whether a DTX is present, which includes determining the boundaries of a DTX region for comparison with the combined symbol estimate vector x. A DTX region is a polyhedron whose boundaries are a set of hyperplanes. The number of hyperplanes is equal to the number of (non-DTX) HARQ messages in the constellation. A constellation, as used herein refers to the set of all possible transmit vectors listed in the HARQ codebook after mapping the bits to BPSK symbols. Note that the DTX vector is an exception because it is all-zero. For example, if the constellation has two points (such as an ACK or NACK as shown in FIG. 6A, then the DTX region is delimited by two hyperplanes.

Figure 6A:
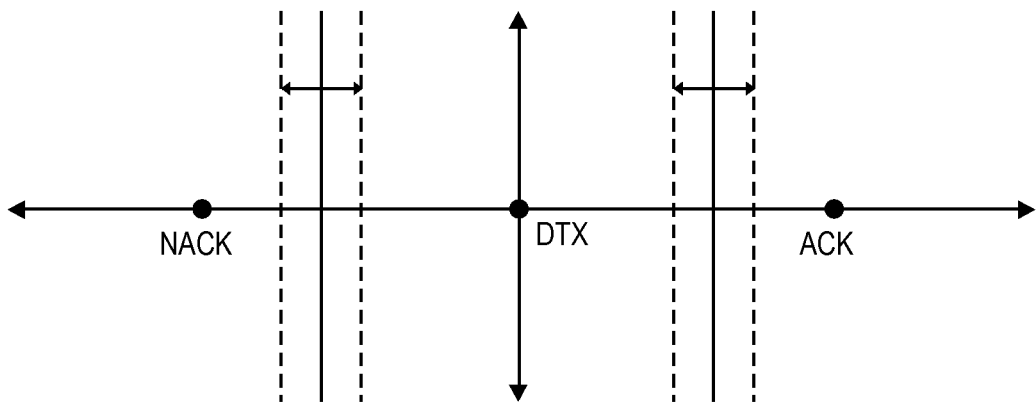
FIG. 6A is a diagram of one embodiment of a standard decision boundary graph.

FIG. 6A is a diagram of one embodiment of a standard decision boundary graph. This boundary graph shows the decision boundaries for differentiating a DTX from other HARQ messages. The decision boundaries define the DTX region and if the combined vector x falls within the DTX region, it is categorized as DTX whereas messages falling in the NACK and ACK regions are categorized as HARQ messages of the corresponding type. The graph shows the decision boundaries where the PRE and POST have been stripped or are otherwise not considered.

Figure 6B:
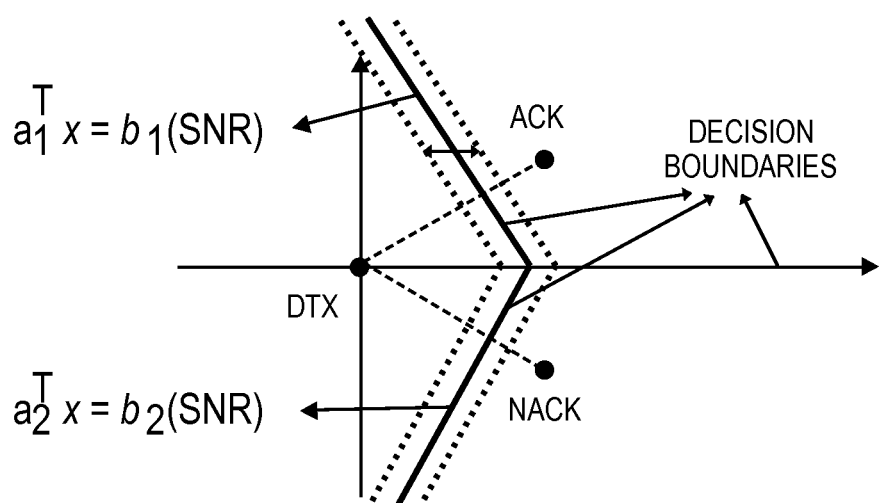
FIG. 6B is a diagram of one embodiment of a modified decision boundary graph.

FIG. 6B is a diagram of one embodiment of a modified decision boundary graph where the PRE and POST are considered as part of the HARQ message. The decision boundaries for this embodiment are defined by the following formula, where the number of points in the constellation in general is M. The DTX region can be defined by the set of inequalities:

$$a_i^H x \leq b(\text{SINR}, P_{FA}), \text{ for } i=1, \ldots, M$$

where $a_i$ is the i th constellation point and $b(\text{SINR}, P_{FA})$ is a parameter that depends on the current SINR and the target FA probability, $P_{FA}$. In two-point constellations, this parameter is given by $$b(\text{SINR}, P_{FA}) = c \cdot \sqrt{\frac{2 \cdot L}{\text{SINR}}} \cdot \text{erfc}^{-1}(2 \times P_{FA}),$$

where c=1 and L is the length of $a_i$ and x. L is either 30 if the PRE and POST are kept and there is a single HARQ message in between or 10 if the PRE and the POST are stripped off the HARQ word. For larger constellations, c is not 1 and can be determined by trial and error.

Figure 6C:
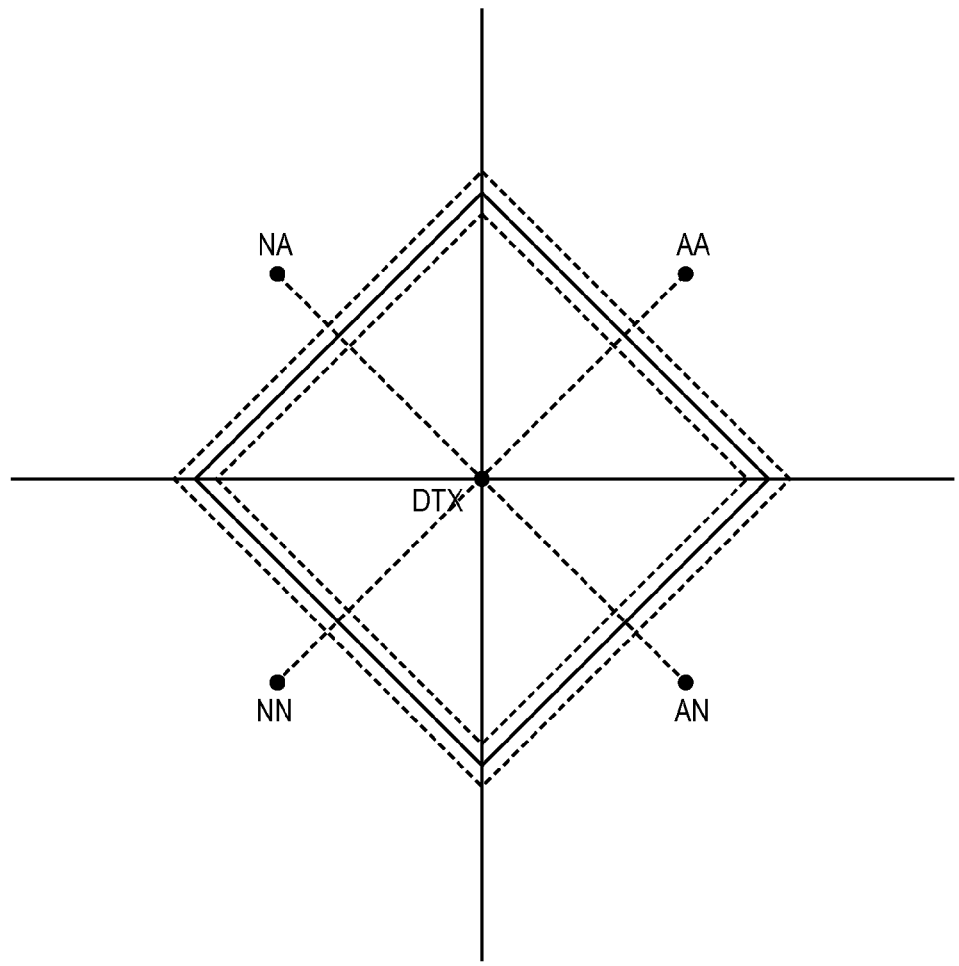
FIG. 6C is a diagram of one embodiment of the decision boundary graph when two HARQ messages are transmitted between the PRE and the POST.

FIG. 6C is a diagram of one embodiment of the decision boundary graph when two HARQ messages are transmitted between the PRE and the POST. This diagram can be used to describe the two cases where the PRE and the POST are included or striped from the HARQ message. The HARQ message in this case can be two HARQ ACKs or NACKs (or a combination of the two). The decision boundaries for this embodiment delineate five possible cases, a case where a DTX is received instead of a HARQ message, a case where a NACK is in a first position and an ACK in a second position, a case where two ACKs are received, a case where two NACKs are received and a case where an ACK is in a first position and a NACK in a second position: The graph shows each of the HARQ message cases in four distinct quadrants and each separated by a hyperplane defining a DTX region in the center of the graph. One skilled in the art would understand that similar graphs and related formulae can define processes for detecting any number of ACKs or NACKs in a HARQ message as well as determining when a DTX has been received in each case.

Returning to the discussion of FIG. 5, the decoder thus must be configured to either consider or remove the PRE and POST and utilize the appropriate decision boundaries for defining the DTX region. With this configuration established, the combined symbol estimate vector x can be checked to determine whether where it falls in relationship to the decision boundaries. The first step can be to form vectors $a_i$ (Block 505) where $a_i$ is an ith constellation point of the signal and where $a_i$ can contain the PRE, POST and a set of HARQ ACKs or NACKS, alternatively the PRE and POST are not utilized. In the case the PRE and POST are kept, $a_i$=[PRE,HARQmessage,POST]. In case they are stripped, then $a_i$=[HARQmessage].

The decoder checks if the combined symbol estimate vector x lies in the DTX region or not by substituting the combined symbol estimate vector x in the inequalities defined above (Block 507). A check is made whether they are satisfied (Block 509). If satisfied, then the decoder outputs DTX and the process is finished (Block 511). However, if the inequalities are not satisfied, the process continues to determine what type of HARQ message has been received (Block 513). In one embodiment, when executing the inequality substitution to determine whether the combined symbol estimate vector x falls within the DTX region, the optimal computation for the decoder does not strip the PRE and POST, but rather keep them since it provides additional robustness against the miss probabilities. However, if the inequalities are not satisfied and the decoder has to proceed to HARQ message type detection, then stripping the PRE and POST at this stage may provide a simpler implementation.

If the combined symbol estimate vector x does not satisfy the inequalities, then the decoder performs a minimum distance detection after removing the DTX point from consideration. The squared Euclidean distance between combined symbol estimate vector x and all the constellation points is calculated as $d_i=\|x-a_i\|^2$ to generate a set of minimum distances corresponding to each constellation point (Block 515). The decoder chooses the point $a_i$ that yields the smallest $d_i$ (Block 517). The corresponding HARQ message type, that is ACK or NACK is then output (Block 519).

Figure 7:
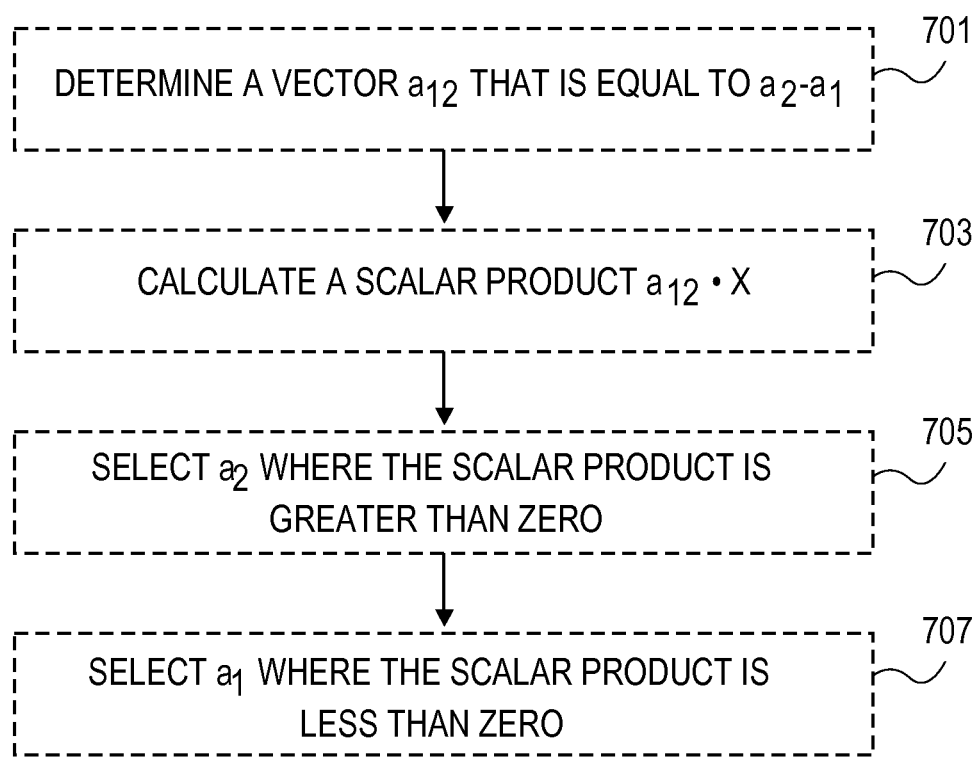
FIG. 7 is a flowchart of one embodiment of a process for differentiating a HARQ acknowledgement from a HARQ negative acknowledgement.

FIG. 7 is a flowchart of one embodiment of a process for differentiating a HARQ acknowledgement from a HARQ negative acknowledgement. In the case of a two point constellation, there is an alternate process that is less resource intensive to pick the best $a_i$. The process determines the vector $a_{12}=a_2-a_1$ (Block 701). The decoder then calculates the scalar product $a_{12} \cdot x$ (Block 703). If the product is greater than zero then $a_2$ is selected (Block 705). In the case where the product is negative, then $a_1$ is selected.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.). For example, in cases where the channel conditions are very good, the base station is encouraged to transmit data with high rates to the UE. Also in this case the UE may receive successfully and issues many ACK messages to be transmitted to the base station. So in this case, one knows that the probability of transmitting an ACK is much higher than that of NACK of DTX. In this case, the process can be configured to prefer to start by checking if the combined receive vector x is an ACK and if not, continue with the other checks.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a base station to decode a high speed dedicated physical control channel (HS-DPCCH) using a preamble and postamble of a hybrid automatic repeat request (HARQ) message while maintaining a fixed false alarm probability of interpreting a discontinuous transmission (DTX) as a HARQ acknowledgement (ACK) or HARQ negative acknowledgement (NACK), the method comprising the steps of:
   receiving a signal from a user equipment (UE);
   despreading the signal using a G-RAKE demodulator;
   combining the despread signal to produce a combined symbol estimate vector x including
      a preamble and postamble of the HARQ message;
   checking the combined symbol estimate vector x to determine whether the signal includes
      a DTX, HARQ ACK or HARQ NACK, wherein the checking of the combined symbol estimate vector further includes determining boundaries of a DTX region, and checking whether the combined symbol estimate vector x lies within the DTX region; and
   outputting the DTX, HARQ ACK or HARQ NACK.

2. The method of claim 1, wherein checking whether the combined symbol estimate vector x lies within the DTX region, further comprises the step of:
   forming a set of vectors $a_i$ where $a_i$ is an ith constellation point of the signal, and wherein $a_i$ includes the preamble and postamble of the HARQ message.

3. The method of claim 2, wherein checking whether the combined symbol estimate vector x lies within the DTX region, further comprises the step of:
   substituting the combined symbol estimate vector x into the inequalities $a_i^H \cdot x \leq b(\text{SINR}, P_{FA})$, for i=1, . . . , M, where $a_i$ is the i th constellation point and $b(\text{SINR}, P_{FA})$ is a parameter that depends on a current SINR and a target FA probability, $P_{FA}$.

4. The method of claim 3, wherein the combined symbol estimate vector x lies within the DTX region, further comprises the step of:
   outputting DTX where the inequalities are satisfied.

5. The method of claim 3, wherein the combined symbol estimate vector x lies outside the DTX region, further comprises the step of:
   determining a set of minimum distances where the inequalities are not satisfied, where a squared Euclidean distance between the combines symbol estimate vector x and all constellation points of the signal is calculated as $d_i=\|x-a_i\|^2$ to populate a set of minimum distances; and
   selecting a constellation point with the minimum distance $d_i$.

6. The method of claim 2, further comprising the steps of:
   determining a vector $a_{12}$ that is equal to $a_1-a_2$;

calculating a scalar product $a_{12}^* x$;

selecting $a_2$ where the scalar product is greater than zero; and selecting $a_1$ where the scalar product is less than zero.

7. The method of claim 1, wherein checking the combined symbol estimate vector x, further comprises the steps of:

determining whether the signal includes a plurality of HARQ ACKs or HARQ NACKs or a combination of a HARQ ACK and HARQ NACK.

8. A base station to decode a high speed dedicated physical control channel (HS-DPCCH) using a preamble and postamble of a hybrid automatic repeat request (HARQ) message while maintaining a fixed false alarm probability of interpreting a discontinuous transmission (DTX) as a HARQ acknowledgement (ACK) or HARQ negative acknowledgement (NACK), the base station comprising:

a transceiver to receive a signal from a user equipment (UE);

a G-RAKE demodulator coupled to the transceiver, the G-RAKE configured to despread the signal and to combine the despread signal to produce a combined symbol estimate vector x including a preamble and postamble of the HARQ message; and a decoder coupled to the G-RAKE demodulator, the decoder configured to receive the combined symbol estimate vector x from the G-RAKE demodulator, to check the combined symbol estimate vector x to determine whether the signal includes a DTX, HARQ ACK or HARQ NACK, and to output the DTX, HARQ ACK or HARQ NACK, where the decoder is further configured to determine boundaries of a DTX region, to check whether the combined symbol estimate vector x lies within the DTX region.

9. The base station of claim 8, wherein the decoder is further configured to form a set of vectors a, where a, is an ith constellation point of the signal, and wherein a, includes the preamble and postamble of the HARQ message.

10. The base station of claim 9, wherein the decoder is further configured to substitute the combined symbol estimate vector x into the inequalities $a_i^H \cdot x \leq b(SINR, P_{FA})$, for $i=1, \ldots, M$, where $a_i$, is the ith constellation point and $b(SINR, P_{FA})$ is a parameter that depends on a current SINR and a target FA probability, $P_{FA}$.

11. The base station of claim 10, wherein the combined symbol estimate vector x lies within the DTX region, the decoder is configured to output DTX where the inequalities are satisfied.

12. The base station of claim 10, wherein the combined symbol estimate vector x lies outside the DTX region, the decoder determines a set of minimum distances where the inequalities are not satisfied, where a squared Euclidean distance between the combines symbol estimate vector x and all constellation points of the signal is calculated as $d_i = \|x - a_i\|^2$ to populate a set of minimum distances, and the decoder selects a constellation point with the minimum distance $d_i$.

13. The base station of claim 9, wherein the decoder is configured to determine a vector $a_{12}$ that is equal to $a_1 - a_2$, calculate a scalar product $a_{12}^* x$, select $a_2$ where the scalar product is greater than zero, and select $a_1$ where the scalar product is less than zero.

14. The base station of claim 8, wherein the decoder is further configured to check the combined symbol estimate vector x to determine whether the signal includes a plurality of HARQ ACKs or HARQ NACKs or a combination of a HARQ ACK and HARQ NACK.

* * * * *